July 14, 1959
L. L. MORRISON
2,895,116
TRIMMING POTENTIOMETER
Filed June 22, 1956
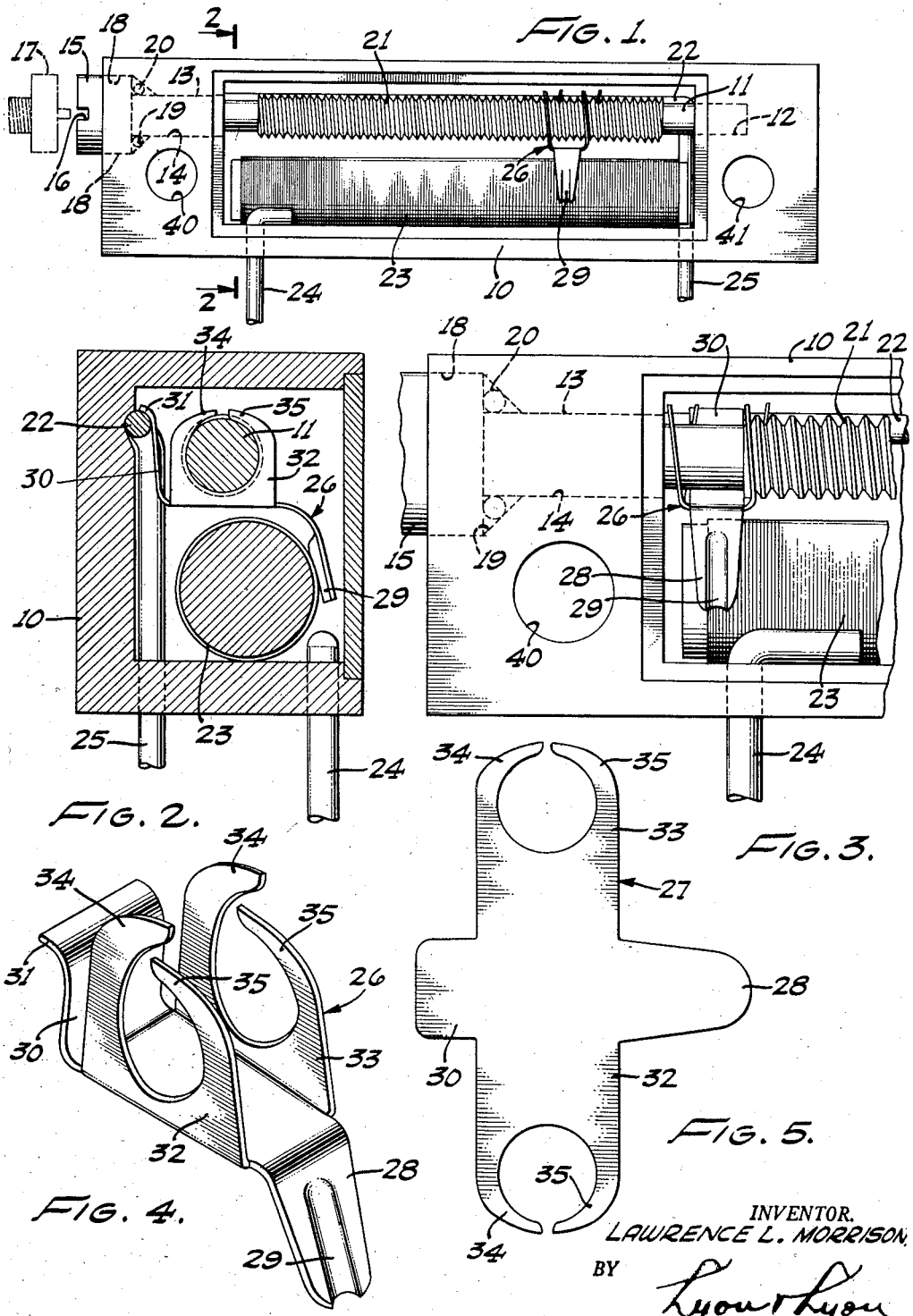
INVENTOR.
LAWRENCE L. MORRISON
BY
Lyon & Lyon
ATTORNEYS

United States Patent Office 2,895,116
Patented July 14, 1959

2,895,116

TRIMMING POTENTIOMETER

Lawrence L. Morrison, Glendale, Calif., assignor to Component Designers, Inc., Alhambra, Calif., a corporation of California Application June 22, 1956, Serial No. 593,184

4 Claims. (Cl. 338—180)

This invention relates to a potentiometer or variable resistor and is characterized by the fact that it is directed to a linear motion potentiometer capable of very closely regulating the electrical output thereof.

It is accordingly one object of the present invention to provide a linear motion potentiometer capable of very accurate setting.

It is another object of this invention to provide such a potentiometer employing novel contact or wiper means.

It is a further object of this invention to provide a potentiometer of the type described in which the operative mechanism is entirely enclosed and hidden from view but in which means are provided for preventing movement of the wiper too far in either direction.

These and other objects, features and advantages will be apparent from the annexed specification, in which:

Figure 1 is a side view of the potentiometer with the side cover plate removed.

Figure 2 is a section taken along the line 2—2 of Figure 1.

Figure 3 is an enlarged fragmentary view similar to Figure 1 showing the wiper in one extreme position.

Figure 4 is a perspective elevation of the wiper or contact.

Figure 5 is a plan view of the wiper blank prior to bending the same to form the device shown in Figure 4.

Referring now more particularly to the drawings, the potentiometer is shown as including a generally rectangular casing 10 in which is mounted a shaft 11 having one end journalled in a bore 12 at one end of the casing and the other end enlarged as at 13 and journalled in a bore 14 in the other end of the casing, the shaft 11 having an enlarged head 15 slotted at 16 for engagement with a conventional screwdriver 17, the head 15 being seated in an enlarged bore 18 which is tapered as at 19 to receive a sealing O-ring 20. Intermediate its ends and for the major portion thereof, the shaft 11 is provided with a screw thread 21. A rod 22 is mounted adjacent the top and along one side of the interior of the potentiometer and is connected to electric leads (not shown). A coil 23 is mounted adjacent the bottom of the interior of the casing of the potentiometer and is likewise connected to electric leads. Contacts 24 and 25 may form the electric connections to the coil 23 and rod 22 respectively. A wiper or contact 26 is provided. In Figure 5, there is shown a blank 27 preferably formed of beryllium copper and from it the contact 26 is formed. It is noted the blank 27 includes a tab 28 which is bent downwardly and creased as at 29 to form a wiper which engages the coil 23. The blank 27 also includes a tab 30 which is bent upwardly and curled over as at 31 to form a wiper engaging the rod 22. Wings 32 and 33 of blank 27 are bent upwardly and the two ears 34 and 35 of each such wing are spread apart as indicated in Figure 4. When assembled, the ears 34 and 35 substantially encircle the shaft 11, each ear 34 and 35 being adapted to engage adjacent flights of the thread 21.

Holes 40 and 41 may be drilled through the ends of the casing to arrange the potentiometer for mounting in series or in stacks upon spaced rods.

In operation, assuming the potentiometer to be connected as desired in an electrical circuit, in order to trim the circuit, the operator will insert screwdriver 17 into the slot 16 and turn the rod 11. As the contact made by the wiper with the coil 23 and the rod 22 prevents the wiper from turning, turning of the rod 11 causes the wiper to move longitudinally on the screw thread 21. This movement may continue in either direction until, for example, the portion 32 including both ears thereof completely disengages the thread 21 and abuts the end of the casing which is the condition approached in Figure 3. Further turning of the shaft 11 to cause motion of the wiper to the left, Figure 3, will simply cause the portion 33 of the wiper to disengage the thread with a rachet-like action. However, portion 32 engaging the end of the casing with a spring-like action will constantly force the wiper into contact with the screw portion 21 so that it is in position to have the ears 34 and 35 properly engage in adjacent flights of the screw thread upon reversing of the turning of the shaft 11.

From the foregoing, it will be seen that by turning of the shaft 11 in the proper direction, the wiper can be caused to traverse the full length of the coil 23 but upon reaching the limited position, the wiper stops and is not forced into braking engagement with the casing, even though the operator should continue turning the shaft 11 because of his inability to see within the casing and note that the limited position has been reached. Screw 21 is very accurately formed and the coil 23 is very carefully wound with the result that a trimming potentiometer is provided which, for a given setting of the wiper, will give a constant resistance value.

While there has been described what is at present considered the preferred embodiment of the invention, it will be understood that various changes and alterations may be made therein without departing from the essence of the invention, and it is intended to cover herein all such changes and modifications as come within the true scope and spirit of the annexed claims.

I claim:

1. In a potentiometer of the type including a coil, a contact bar and a slider mounted for sliding contact with said coil and contact bar, all mounted in a closed casing, the improvement comprising: A shaft having a thread chased thereon for a portion only of its length and unthreaded adjacent each end thereof; said slider having a pair of spaced extensions each adapted to substantially surround said shaft; each of said extensions being bifurcated into two branches, with each branch engaged in a flight of said thread next adjacent a flight engaged by its associated branch.

2. In a potentiometer of the type including a coil, a contact bar and a slider mounted for sliding contact with said coil and contact bar, all mounted in a closed casing, the improvement comprising: A shaft having a thread chased thereon for a portion only of its length and unthreaded adjacent each end thereof; said slider having a pair of spaced extensions each adapted to substantially surround said shaft; each of said extensions being bifurcated into two branches, with each branch engaged in a flight of said thread next adjacent a flight engaged by its associated branch; said slider being arranged to travel on said shaft on rotation of said shaft; one of said extensions being adapted to disengage said thread on movement of said slider toward one end of said shaft and to yieldingly engage said casing so as to bias the other of said extensions toward engagement with said thread.

3. In a potentiometer of the type including a coil, a contact bar and a slider mounted for sliding contact with said coil and contact bar, all mounted in a closed casing, the improvement comprising: A shaft having a thread chased thereon for a portion only of its length and unthreaded adjacent each end thereof; said slider having a pair of spaced extensions each adapted to substantially surround said shaft; each of said extensions being bifurcated into two branches, with each branch engaged in a flight of said thread next adjacent a flight engaged by its associated branch; said slider being arranged to travel on said shaft on rotation of said shaft; one of said extensions being adapted to disengage said thread on movement of said slider toward one end of said shaft and to yieldingly engage said casing so as to bias the other of said extensions toward engagement with said thread and the other of said extensions being adapted to similarly engage said casing and disengage said thread on movement of said slider toward the other end of said thread.

4. In a potentiometer of the type including a coil, a contact bar and a slider mounted for sliding contact with said coil and contact bar all mounted in a closed casing, the improvement comprising: A shaft having a thread chased thereon for a portion only of its length and unthreaded adjacent each end thereof; said slider having a pair of spaced extensions each adapted to substantially surround said shaft; each of said extensions being bifurcated into two branches, with each branch engaged in a flight of said thread next adjacent a flight engaged by its associated branch; said slider being arranged to travel on said shaft on rotation of said shaft; one of said extensions being adapted to disengage said thread on movement of said slider toward one end of said shaft and to yieldingly engage said casing so as to bias the other of said extensions toward engagement with said thread and the other of said extensions being adapted to similarly engage said casing and disengage said thread on movement of said slider toward the other end of said thread; said shaft and coil being straight and parallel and the movement of said slider being linear.

References Cited in the file of this patent

UNITED STATES PATENTS

| | | |
|---|---|---|
| 2,149,848 | Lampel | Mar. 7, 1939 |
| 2,258,652 | James | Oct. 14, 1941 |
| 2,448,190 | Olesky | Aug. 31, 1948 |
| 2,761,045 | Matthew | Aug. 28, 1956 |

FOREIGN PATENTS

| | | |
|---|---|---|
| 588,558 | Great Britain | May 28, 1947 |
| 668,186 | Great Britain | Mar. 12, 1952 |
| 821,376 | Germany | Nov. 19, 1951 |
| 264,626 | Italy | May 4, 1929 |